Patented Jan. 13, 1953

2,625,541

UNITED STATES PATENT OFFICE 2,625,541

AZO DYES FROM 2-AMINOTHIOPHENE

Robert Sidney Long, Bound Brook, N. J., assignor to American Cyanamid Company, New York, N. Y., a corporation of Maine No Drawing. Application October 19, 1950, Serial No. 191,082

6 Claims. (Cl. 260—152)

This invention relates to new azoic dyestuffs and it comprises the azoic dyestuffs which are prepared from 2-acetoacetylaminothiophene and which contain a thiophene nucleus derived from said substituted aminothiophene; the said dyestuffs being prepared by coupling the 2-acetoacetylaminothiophene with diazotized aromatic amines free of water-solubilizing groups, such as the so-called "ice color" diazo compounds, all as more fully hereinafter described and claimed.

The azoic compounds so prepared are stable azo compounds containing a thiophene nucleus in a certain relation to the azo groups thereof and having certain advantageous properties, as more fully shown post. As a class, they are water-insoluble compounds. Also, they are strong colors and have good fastness properties. In general, these new azoic compounds are useful and advantageous as dyestuffs and pigments in dyeing textiles and coloring other materials.

In particular, the dyestuffs of the present invention are stable, water-insoluble azo compounds having the following generic formula:

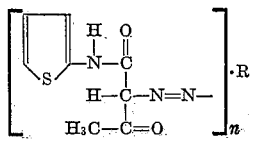

wherein R is an aromatic carbocyclic radical free of water-solubilizing groups and $n$ is a positive integer less than 3, such as 1 or 2.

In preparing such azoic coloring matters, I used a particular coupling component, namely 2-acetoacetylaminothiophene and couple it with the diazo compound to introduce a thiophene nucleus into the resulting azo compound in the desired relation to the azo group thereof as shown in the generic formula given ante. In doing so, various diazo components can be coupled with the 2-acetoacetylaminothiophene to obtain a variety of azoic coloring matters. In general, diazotized aromatic carbocyclic amines which are free of solubilizing groups, such as sulfonic and carboxylic acid groups, may be used. Such diazotized amines readily couple with the 2-acetoacetylaminothiophene, it being one of the advantages of this coupling component that it readily couples with practically all "ice color" diazo compounds. In this way, a wide variety of azoic coupling matters can be readily produced by the present invention, as is further described and illustrated post.

The particular coupling component used in making such azo dyes is an acylated derivative of 2-aminothiophene having the following formula:

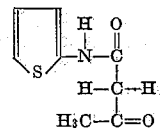

This 2-acetoacetylaminothiophene is a stable compound whereas 2-aminothiophene is very unstable. Further, it readily couples with various diazo compounds to form azo compounds in which the azo group is attached to the acetoacetyl radical of said 2-aminothiophene compounds. When so coupled, it yields azo dyestuffs having the generic formula given ante. Thus, this particular coupling component is an important and essential element in preparing such azo compounds.

The 2-acetoacetylaminothiophene is itself a new chemical compound and is described and claimed by me as such in my companion application Ser. No. 191,081, filed October 19, 1950, simultaneously with the present application.

In my copending application, Ser. No. 191,081, I also describe methods of preparing 2-acetoacetylaminothiophene from 2-aminothiophene wherein the unstable 2-aminothiophene is converted into the stable 2-acetoacetylaminothiophene. As stated in said application, 2-aminothiophene is extremely unstable and readily oxidizes in air to a solid mass which cannot be practically utilized. Accordingly, therefore, 2-aminothiophene had little or no practical utility in the manufacture of azo dyestuffs or the intermediates used in the manufacture thereof. On the other hand, in the method described in my said application, Ser. No. 191,081, the unstable 2-aminothiophene is converted into a stable derivative thereof which is useful in making azo dyes. In doing so, the unstable 2-aminothiophene is formed, in situ, in the reaction mixture and is converted into the stable 2-acetoacetylaminothiophene.

In the present invention, the 2-acetoacetylaminothiophene is further converted into other stable compounds which contain both an azo group and a thiophene ring in a certain relation to each other and which are useful as dyestuffs and pigments.

Thus, my companion application, Ser. No. 191,081, relates to 2-acetoacetylaminothiophene and methods of making the same whereas the present application relates to new azo compounds prepared from said coupling component.

In the present invention, the 2-acetoacetylaminothiophene is used as a coupling component to introduce a thiophene ring into the azo dyestuffs in a certain relation to the azo groups thereof. Further, it has other advantages in making such dyestuffs. For instance, one advantage of this particular coupling component is that it readily couples with practically all "ice color" diazo compounds and a wide variety of azoic coloring matters are produced which are characterized by good application and fastness properties. The colors may be prepared in various forms, thus, for example, pigments may be produced with or without substrates and textile materials can be dyed by the customary procedures used with ice colors. Thus, for example, cellulosic materials may be impregnated or padded with an alkaline solution of the said coupling component and the cloth then dyed by immersion in a solution of the diazo compound; or the padded cloth may be printed with a printing paste containing such a diazonium salt. Another method of utilizing the dyestuffs of the present invention consists in mixing the 2-acetoacetylaminothiophene with a water-soluble diazo amino or diazo imino compound, together with the conventional alkali and thickener, to form a printing paste. This is then printed on the fiber and the print developed in the usual manner by exposure to the hot vapors of an organic acid, such as acetic or formic acid. Printing may also be effected with a mixture of the said coupling component, a diazo sulfonate and an oxidizing agent, dissolving the mixture in dilute alkali and producing a printing paste with a customary thickener. After printing on the textile material, the color can then be developed by treatment with steam in the presence of weakly acidic vapors.

The fact that the said coupling component of the present invention couples so readily with practically all ice-colored diazo compounds renders the present invention useful for the production of a wide range of colors. Typical diazo or tetrazo compounds, which can be coupled with the arylide to produce the dyestuffs of the present invention, are those obtained by diazotizing aniline, its homologs and halogen, nitro, alkoxy, aryloxy, acyl amino, sulfone, sulfonamide and cyano derivatives, xenylamine, the various naphthyl amines, amino azo compounds, benzidine and its derivatives, such as dichlorobenzidine, dianisidine, and the like, diaminostilbenes, etc. The ready coupling of the said coupling component also makes it suitable for the production of polyazo dyes in which a polyamino compound is diazotized and coupled in stages. Polyazo dyes may be prepared in which different diazo components are present and, of course, these polyazo dyes may also contain another coupling component, such as any of the conventionally used ice-color coupling components.

The present invention will be illustrated in greater detail in conjunction with the following specific examples, the parts being by weight unless otherwise specified.

*Example 1*

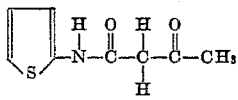

Fifteen (15) parts of the tin chloride double salt of 2-aminothiophene is slurried under nitrogen in 100 parts of water and 140 parts of ether and treated, with cooling, with 63 parts of 5 N sodium hydroxide. The ether layer is separated, dried over sodium sulfate, and treated with 3.4 parts of diketene. When the reaction is complete, the 2-acetoacetylaminothiophene is isolated by concentrating, cooling and filtering the solution.

*Example 2*

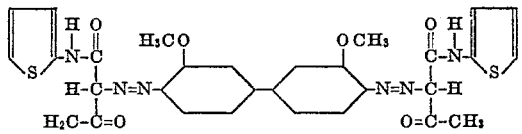

The 2-acetoacetylaminothiophene of Example 1 is blended with sucrose and an equivalent quantity of the stabilized diazo compound prepared by reacting tetrazotized dianisidine and N-allylglycine in aqueous medium in the presence of an antacid. The blend is then converted to a printing paste by admixture of a suitable quantity of a starch or gum thickener, printed on cotton cloth and developed in the usual manner by exposure to hot acetic acid vapors. Brownish-orange prints are produced.

*Example 3*

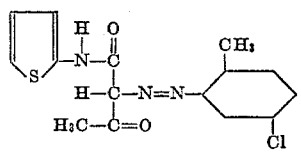

The procedure of Example 2 is followed, except that the stabilized dianisidine diazo compound is replaced by an equivalent amount of the corresponding stabilized diazo compound of 2-methyl-5-chloroaniline. The prints obtained are yellow, showing good fastness properties.

*Example 4*

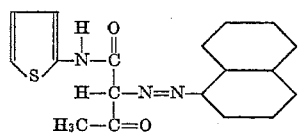

The procedure of Example 3 is followed, using the corresponding stabilized diazo compound of alpha-naphthylamine. Reddish-yellow prints are obtained.

I claim:

1. The water insoluble azo compounds having the following formula:

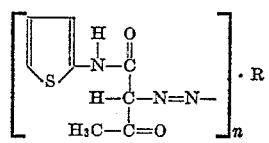

wherein R is an aromatic carbocyclic radical free of water solubilizing groups and $n$ is a positive integer less than 3.

2. The water insoluble azo compounds having the following formula:

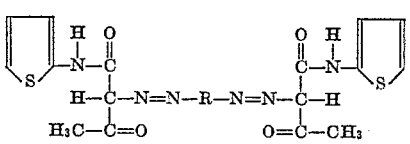

wherein R is a divalent aromatic radical free of water solubilizing groups.

3. The water insoluble azo compound having the following formula:

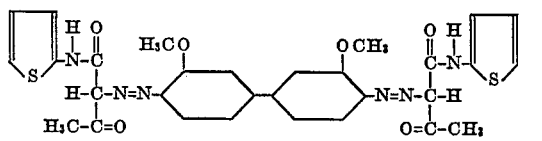

4. The water insoluble azo compounds having the following formula:

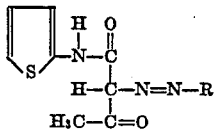

where R is an aromatic carbocyclic radical free of water solubilizing groups.

5. The water insoluble azo compound having the following formula:

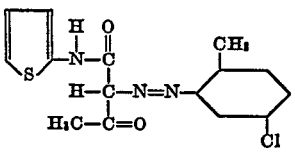

6. The water insoluble azo compound having the following formula:

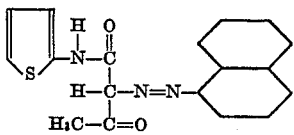

ROBERT SIDNEY LONG.

REFERENCES CITED

The following references are of record in the file of this patent:

UNITED STATES PATENTS

| Number | Name | Date |
| --- | --- | --- |
| 2,144,219 | Etzmiller | Jan. 17, 1939 |
| 2,443,598 | Cheney et al. | June 22, 1948 |
| 2,468,457 | Orem | Apr. 26, 1949 |